United States Patent [19]
Sato et al.

[11] Patent Number: 5,906,465
[45] Date of Patent: May 25, 1999

[54] LOW INSERTION FORCE AND HIGH RETENTION FORCE CHRISTMAS TREE-TYPE CLIP

[75] Inventors: Akiyoshi Sato, West Bloomfield; Jeromy William Tomlin, Berkley, both of Mich.

[73] Assignee: Yazaki Corporation, Tokyo, Japan

[21] Appl. No.: 09/103,213

[22] Filed: Jun. 23, 1998

[51] Int. Cl.⁶ ................................................ F16B 19/00
[52] U.S. Cl. ........................ 411/510; 248/68.1; 411/508
[58] Field of Search ................ 411/508–510, 913; 24/297; 248/68.1

[56] References Cited

U.S. PATENT DOCUMENTS

| | | | |
|---|---|---|---|
| 3,722,037 | 3/1973 | Jaeger | 411/508 |
| 3,756,155 | 9/1973 | Schuplin | 411/508 |
| 4,750,878 | 6/1988 | Nix | 411/509 |

FOREIGN PATENT DOCUMENTS 13961103  6/1975  United Kingdom ................ 411/510

*Primary Examiner*—Flemming Saether
*Attorney, Agent, or Firm*—Young & Basile, P.C.

[57] ABSTRACT

A Christmas tree type clip for mounting a wire harness or electrical component to a vehicle body panel, the clip being designed to provide a low insertion force and a high retention or withdrawal force. The clip has a hollow, thin-walled, flexible stem supporting a plurality of conventional barbs along its length. The interior of the hollow, flexible stem includes pairs of opposed withdrawal-hindering fingers associated with the barbs such that insertion force exerted on the walls of the stem from the barbs is transmitted to the fingers. The opposed pairs of fingers are angled and spaced from one another such that insertion force spreads the fingers further apart, but withdrawal force exerted on the barbs forces the opposed fingers into withdrawal-hindering contact with one another.

10 Claims, 3 Drawing Sheets

LOW INSERTION FORCE AND HIGH RETENTION FORCE CHRISTMAS TREE-TYPE CLIP

FIELD OF THE INVENTION

This invention relates in general to clips for securing electrical connectors and wire harnesses to vehicle body panels, and more specifically to such clips known as "Christmas" tree-type clips.

DISCUSSION OF RELATED ART

Various types of clips for fastening electrical connectors or wire harnesses to vehicle body panels are known in the art. The clip is typically inserted through a hole or slot in the body panel. One well-known and widely used clip is the "Christmas-tree" type comprising a central shaft or stem with angled, stepped barbs to prevent the clip from being withdrawn from the aperture.

U.S. Pat. No. 5,324,151 discloses one such clip. The clip of the '151 patent is hollow in the stem, allowing the sides to deflect inwardly during insertion to reduce the insertion force. But the sides of the stem also deflect inwardly during withdrawal of the clip from the panel, reducing the retention force.

Japanese Patent Publication 8-42536 (1996) illustrates an arrowhead-type clip secured to a flat base. The base is attached to a wire harness by tape. Arms extending from the base act directly against the clip to help keep the clip in engagement with a panel. Japanese Patent 60-134985 (1985) shows yet another style of Christmas tree clip.

SUMMARY OF THE INVENTION

In general the Christmas tree clip according to the present invention is characterized by a hollow, thin-walled "trunk" or stem which is flexible and deformable upon insertion of its barbs through a body panel aperture, resulting in low insertion force. Additionally, the hollow interior of the flexible, thin-walled stem is provided with inwardly and upwardly angled fingers or tabs provided in opposing sets or pairs, with space between the opposing fingers in each pair. The angle of the fingers and the spacing between them allows them to flex upon clip insertion so that they do not interfere with the low insertion force. However, upon withdrawal of the clip from the body panel aperture, the angled fingers are forced by the deformation of the thin-walled stem into interfering engagement with one another, i.e. the ends of opposite fingers in a pair are forced together to increase the stiffness of the clip. The force needed to withdraw the clip is consequently higher than the insertion force.

This invention, together with other objects, features, aspects and advantages thereof, will be more clearly understood from the following description, considered in conjunction with the accompanying drawings.

DETAILED DESCRIPTION OF THE ILLUSTRATED EMBODIMENT

Figure 1:
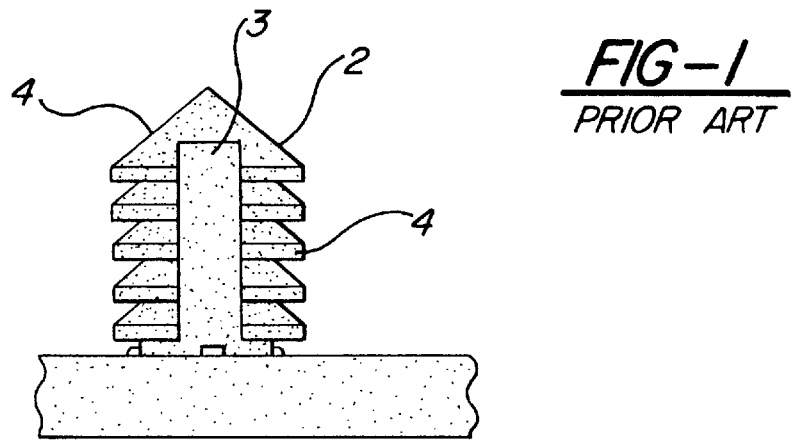
FIG. 1 is a side elevational view of a first prior art Christmas tree clip with a solid stem.

FIG. 1 is a side view of a prior art Christmas tree type clip 2 having a solid stem 3. While the solid stem serves to reinforce the stiffness of flexible conical barbs 4 to make withdrawal from an aperture difficult, it also increases the insertion force needed to insert clip 2 into an aperture in a panel.

Figure 2:
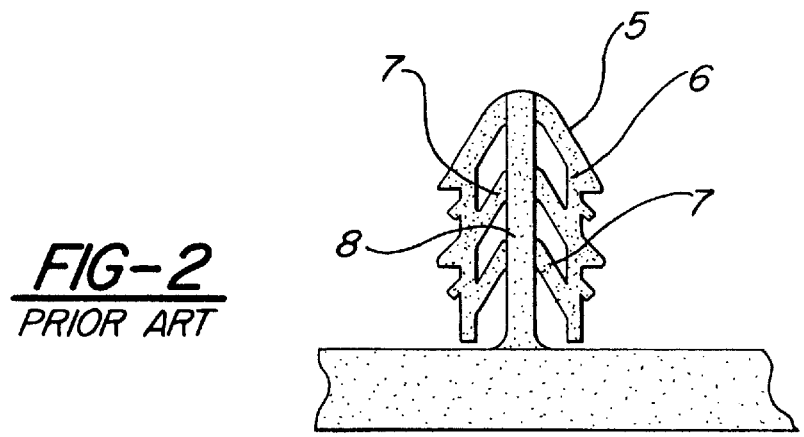
FIG. 2 is a side elevational view of a second prior art Christmas tree clip with a hollow, internally-stiffened stem.

FIG. 2 illustrates a second type of prior art Christmas tree clip 5 with a hollow stem 6 having a network of reinforcing members 7 integrally connected by a central stiffening web 8. While insertion force is somewhat reduced as compared to the FIG. 1 embodiment, the integrally joined nature of members 7 makes them relatively stiff and still requires a fairly high insertion force.

Figure 3:
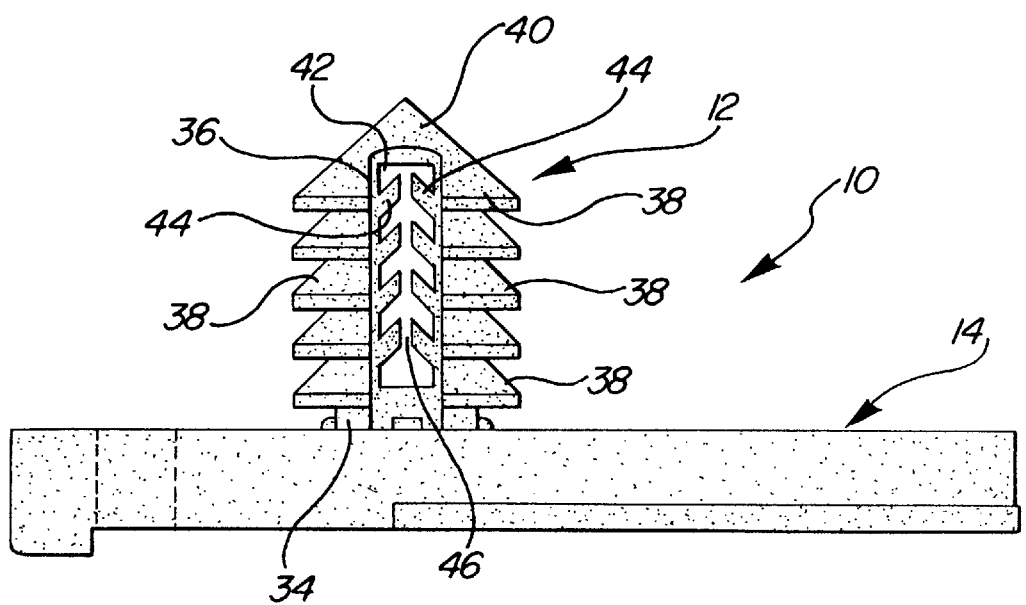
FIG. 3 is a side elevational view of a Christmas tree clip according to the present invention.
Figure 4:
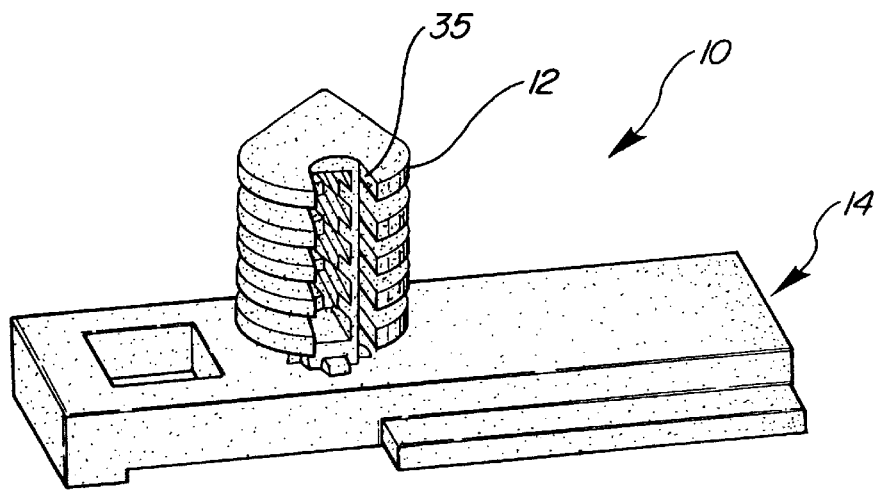
FIG. 4 is a perspective view of the inventive clip of FIG. 3.

Referring to FIGS. 3 and 4, a fastener 10 includes a Christmas-tree type clip 12 according to the present invention. Clip 12 is illustrated as a molded plastic clip mounted on and integral with a specific type of platform 14, although it will be apparent to those skilled in the art that any type of known platform (e.g. wire harness taping tabs) can be used with the present invention, which resides in the clip structure 12.

Referring to FIG. 3, clip 12 has a base 34 attached to platform 14. A flexible, thin-walled "trunk" or stem 36 of cylindrical or rectangular cross-section extends vertically from base 34. Stem 36 supports a plurality of vertically stacked and spaced barbs 38 of a generally standard type and shape. The barbs 38 are generally conical, interrupted by rectangular cutouts 35 (FIGS. 4 and 5) on opposite sides of clip 12. A conical cap portion 40 is formed on the uppermost barb for initial ease of insertion into an aperture in a vehicle body panel.

Figure 8:
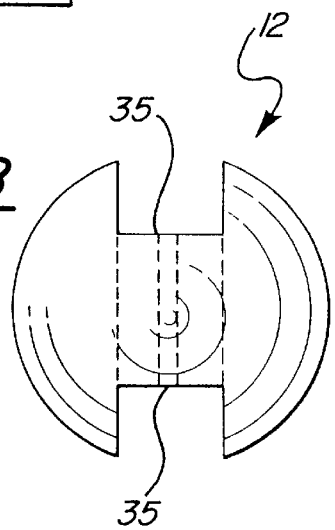

Thin-walled stem 36 includes a hollow interior 42 and opposing pairs of spaced withdrawal fingers 44. In the illustrated embodiment, four pairs of opposing fingers 44 extend upwardly and inwardly along the length of stem 36 between the base and cap portion, each pair generally corresponding to one of barbs 38. The fingers in each pair extend toward one another but are separated by a gap 46. The fingers are angled upwardly toward the cap portion and preferably have a width (in plan view, FIG. 8) equal to the width or diameter of their respective wall portions of stem 36.

Figure 5:
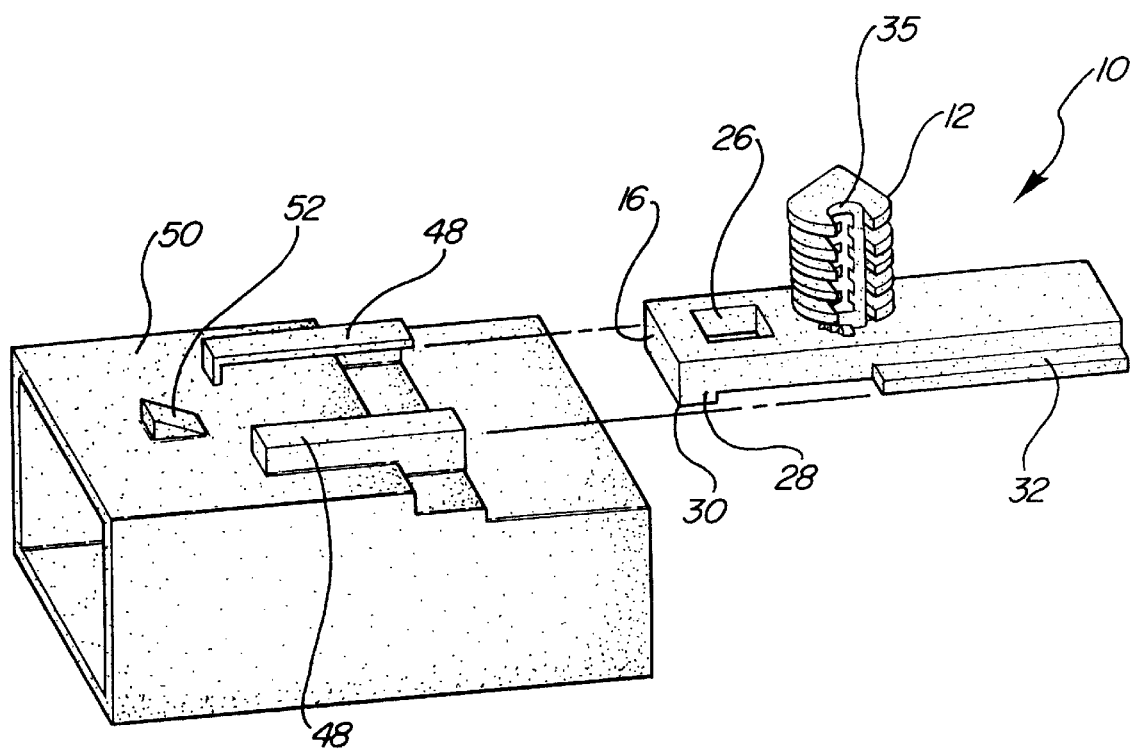
FIG. 5 illustrates a standard wire harness connector housing adapted to mount a Christmas tree clip according to the present invention with a slide-mounted base portion.

In operation, the inventive Christmas tree clip 12 can be used with a mounting platform 14 such as that illustrated in FIGS. 4 and 5, inserted in sliding fashion between tracks or rails 48 (FIG. 5) on a connector 50 in known manner. Platform guides 32 slide under rails 48. A beveled edge 30 at the first end 16 of the mounting platform slides over a ramp 52 on the connector. Ramp 52 subsequently snaps into aperture 26 on the platform as step 28 is pushed past the ramp. The fastener 10 with clip 12 is thereby secured to the connector, and clip 12 can be used to secure the connector to a vehicle body panel (not shown) in known manner.

Figure 6:
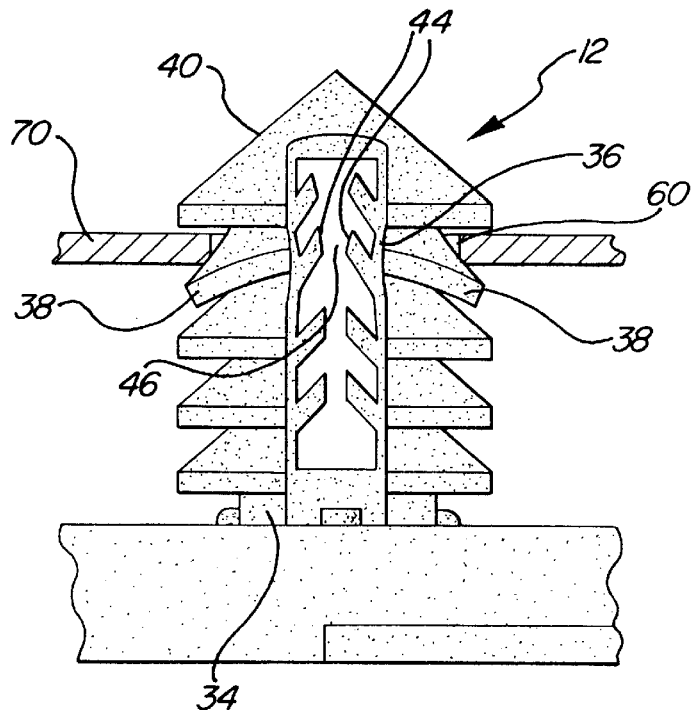
FIGS. 6 and 7 are side views of the inventive clip of FIG. 3, illustrating the low insertion force and high withdrawal force deformations, respectively, of various portions of the clip; and, FIG. 8 is a plan view of the inventive clip of FIG. 3.
Figure 7:
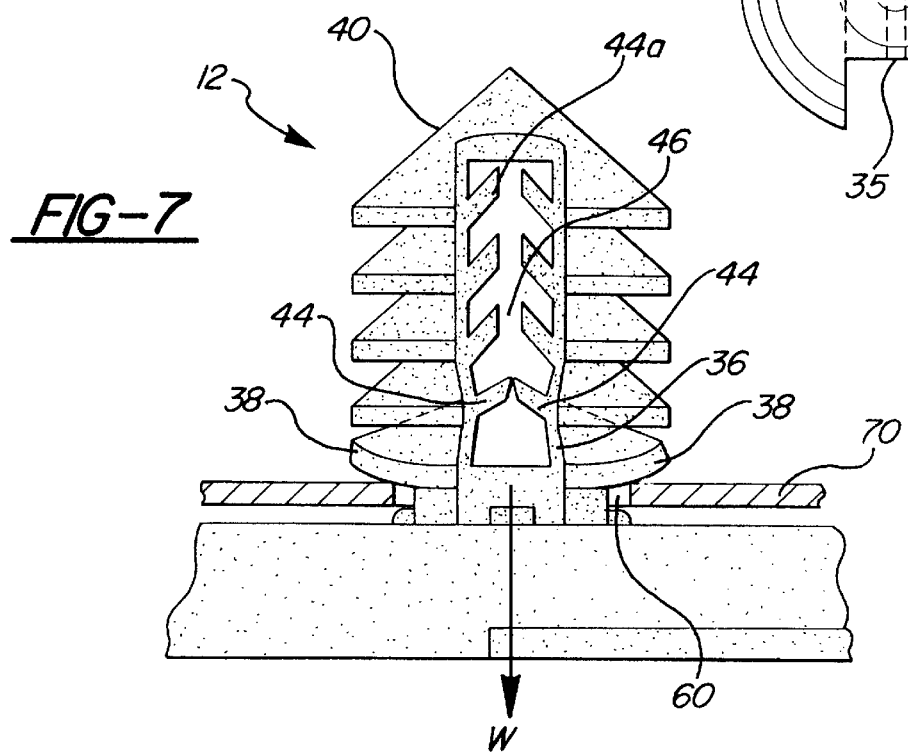

Referring next to FIGS. 6 and 7, clip 12 is shown being inserted and withdrawn, respectively, from an aperture 60 in a body panel 70, with the resultant forces and clip deformation illustrated schematically. In FIG. 6, clip 12 is shown inserted partway into the aperture, with the barb or barb portions 38 engaging the aperture being deformed downwardly with a resultant deformation of stem 36 in which the associated pair of withdrawal fingers 44 is flexed upwardly and apart, thereby increasing the gap between them and preventing any interference with insertion. The flexible, thin-walled nature of stem 36 and the flex-apart nature of fingers 44 results in a low insertion force. Insertion is further aided by the interruption of barbs 38 by rectangular cutouts 35, best shown in FIG. 8, such that each barb 38 can be considered to comprise two semi-circular half barb portions which are connected to the thin-walled stem 36.

It will be understood by those skilled in the art that the exact shape and extent of continuity of the external barbs is not critical to the invention.

In FIG. 7, the fully-inserted clip 12 has a withdrawal force exerted on the base of its stem 36, schematically illustrated by the arrow W. Flexible barb 38 and stem 36 adjacent the aperture flex under the withdrawal force, with a resulting downward and inward force component exerted on the associated set of withdrawal fingers 44 such that their opposing faces 44a are forced together to stiffen and reinforce the stem. This increases the amount of force needed to flex the associated barb 38 sufficiently to withdraw it through body panel aperture 60. This increase in withdrawal force occurs for each subsequent barb 38 and set of fingers 44 withdrawn through the aperture, making withdrawal difficult and accidental withdrawal almost impossible.

Although inventive clip 12 is shown mounted on a sliding platform for attachment to a connector, clip 12 can also be mounted on a semi-circular wire harness taping provision as one possible alternative mounting arrangement. Such known taping provisions provide surfaces around which tape is wrapped to secure clip 12 to a wire harness.

It will be understood by those skilled in the art that although a specific embodiment of, and use for, the invention have been illustrated above, clips using this invention may take different forms and may be used with other electrical components. Since minor changes and modifications varied to fit particular operating requirements and environments will be understood by those skilled in the art, this invention is not considered limited to the specific examples chosen for purposes of illustration. The invention is meant to include all changes and modifications which do not constitute a departure from the true spirit and scope of this invention as claimed in the following claims and as represented by reasonable equivalents to the claimed elements.

What is claimed is:

1. A clip adapted to attach wire harnesses and electrical components to vehicle body panels by inserting the clip through a body panel aperture, comprising:

a hollow, flexible, thin-walled stem;

a plurality of vertically-spaced external barbs attached to the stem, such that an insertion force on a barb causes it to flex an associated portion of the stem, and a withdrawal force on a barb causes it to flex the associated portion of the stem; and a set of withdrawal-hindering fingers formed on an inside surface of the hollow stem on portions of the stem associated with at least one of the barbs, the set of fingers comprising two opposed, upwardly angled fingers having a gap between them in an at-rest position, the gap remaining open when an insertion force is exerted on the associated barb, and the gap being closed such that the fingers abut in withdrawal-hindering contact when a withdrawal force is exerted on the associated barb.

2. A clip as defined in claim 1, wherein the clip includes a plurality of sets of withdrawal-hindering fingers associated with a plurality of the barbs.

3. A clip as defined in claim 1, wherein the stem comprises two opposing wall portions, each barb comprises two barb portions, one barb portion being associated with each of the opposing wall portions of the stem, and the set of withdrawal-hindering fingers comprises a finger formed on each one of the opposing wall portions in association with a barb portion.

4. A clip as defined in claim 3, wherein each finger has a width corresponding to a width of the wall portion on which it is mounted.

5. A clip as defined in claim 1, wherein the end faces of the fingers are parallel to a longitudinal axis of the stem in the at rest position.

6. A clip as defined in claim 1, wherein the barbs are interrupted by a cutout extending vertically through the fastener and providing access to the interior of the stem.

7. A clip as defined in claim 6, wherein the stem comprises two opposed wall portions and two open faces, and the cutout portion is contiguous with the open faces of the stem.

8. A clip as defined in claim 1, wherein the clip is secured to a mounting provision which is adapted to be secured to a wire harness or electrical component.

9. A clip adapted to attach wire harnesses and electrical components to vehicle body panels by inserting the clip through a body panel aperture, comprising:

a hollow stem comprising two thin-walled, flexible opposed wall portions;

a plurality of pairs of barb portions spaced vertically along the stem, with each barb portion in a pair attached to one of the wall portions of the stem opposite the other barb portion in the pair;

a plurality of pairs of withdrawal-hindering fingers spaced vertically along inside surfaces of the wall portions of the stem, each pair of fingers comprising an upwardly- and inwardly-angled finger attached to each one of the wall portions of the stem at a point associated with one of the barb portions on the stem, the fingers having free ends opposing one another and separated by a gap in an at-rest position in which no withdrawal or insertion force is exerted on the barb portions of the clip, the gap between and the angle of each pair of fingers being such that the free ends of each pair are forced into withdrawal-hindering contact with each other when withdrawal force is exerted on an associated pair of barb portions.

10. A clip for mounting a wire harness or electrical component to a vehicle body panel, the clip being designed to provide a low insertion force and a higher retention or withdrawal force, the clip comprising:

a hollow, thin-walled, flexible stem supporting a plurality of barbs spaced externally along its length;

a plurality of pairs of opposed withdrawal-hindering fingers supported by the stem and spaced internally along its length such that insertion force exerted on the stem from the barbs is transmitted to the fingers, the opposed fingers in a pair being angled and spaced from one another in an at-rest position such that insertion force exerted on the stem by the barbs spreads the fingers apart, and withdrawal force exerted on the stem by the barbs forces one or more pairs of the fingers into withdrawal-hindering contact with one another.

* * * * *

UNITED STATES PATENT AND TRADEMARK OFFICE
CERTIFICATE OF CORRECTION

PATENT NO. : 5,906,465
DATED : May 25, 1999
INVENTOR(S) : Sato et al.

It is certified that error appears in the above-identified patent and that said Letters Patent is hereby corrected as shown below:

Column 3, line 59, after "surface of the" delete --hollow--;
Column 3, line 59, delete "portions" and insert --a portion--;
Column 4, line 5, delete "opposing" and insert --opposed--;
Column 4, line 7, delete "opposing" and insert --opposed--;
Column 4, line 9, after "each" delete "one";
Column 4, line 9, delete "opposing" and insert --opposed--;
Column 4, line 16, delete "at rest" and insert --at-rest--;
Column 4, line 38, after "each" delete "one".

Signed and Sealed this

Seventh Day of December, 1999

Q. TODD DICKINSON

Attest:

Attesting Officer

Acting Commissioner of Patents and Trademarks